Figure 4:
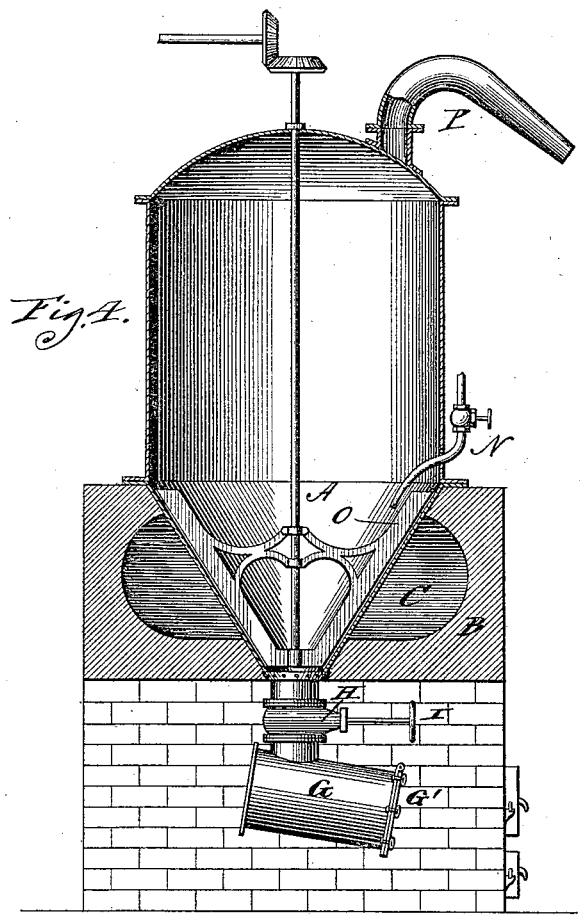

(No Model.) 3 Sheets—Sheet 1.
A. DOMEIER & O. C. HAGEMANN.
PROCESS OF DISTILLING GLYCERINE RECOVERED FROM SPENT SOAP LYE.
No. 428,471. Patented May 20, 1890.
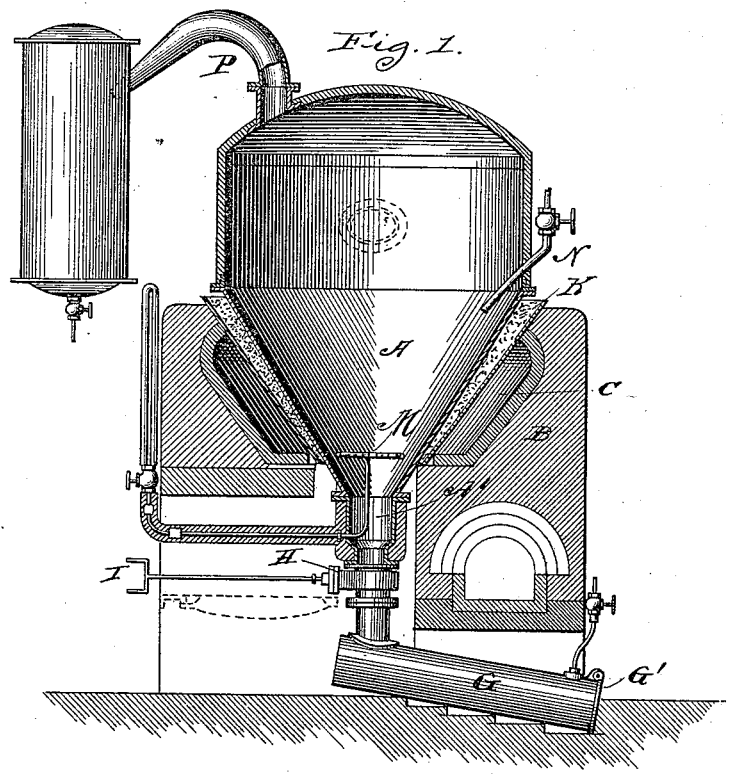
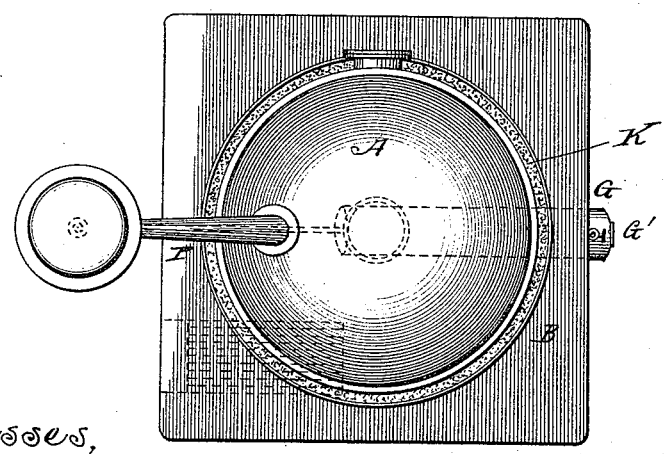
Witnesses,
J. S. Mann
C. C. Linthicum
Inventors
Albert Domeier
Otto Christian Hagemann
By, Offield & Towle Attys.

(No Model.) 3 Sheets—Sheet 2.
A. DOMEIER & O. C. HAGEMANN.
PROCESS OF DISTILLING GLYCERINE RECOVERED FROM SPENT SOAP LYE.
No. 428,471. Patented May 20, 1890.
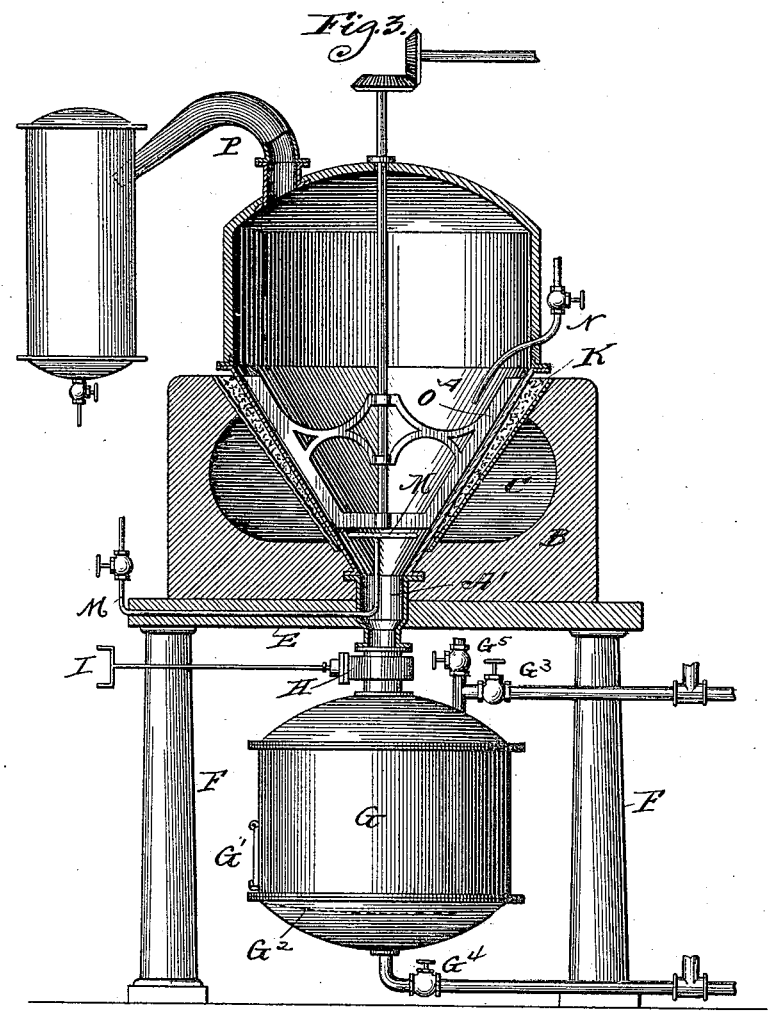

(No Model.) 3 Sheets—Sheet 3.

A. DOMEIER & O. C. HAGEMANN.
PROCESS OF DISTILLING GLYCERINE RECOVERED FROM SPENT SOAP LYE.

No. 428,471. Patented May 20, 1890.

Witnesses,
T. S. Mann,
C. C. Linthicum

Inventors,
Albert Domeier
Otto Christian Hagemann
Offield & Towle
Atty's.

United States Patent Office.

ALBERT DOMEIER AND OTTO CHRISTIAN HAGEMANN, OF LONDON, ENGLAND, ASSIGNORS TO JAMES S. KIRK & CO., OF CHICAGO, ILLINOIS, AND ALBERT DOMEIER, OF LONDON, ENGLAND.

PROCESS OF DISTILLING GLYCERINE RECOVERED FROM SPENT SOAP-LYE.

SPECIFICATION forming part of Letters Patent No. 428,471, dated May 20, 1890.

Application filed September 9, 1889. Serial No. 323,274. (No specimens.)

*To all whom it may concern:*

Be it known that we, ALBERT DOMEIER, merchant, and OTTO CHRISTIAN HAGEMANN, chemical engineer, both of London, England, have invented certain new and useful Improvements in the Distillation of Glycerine Recovered from Spent Soap-Lye, of which the following is a specification.

The object of our invention is to provide an improved process for the distillation of crude glycerine recovered from spent soap-lye.

In the distillation of concentrated spent soap-lye or the crude glycerine recovered therefrom a large amount of mineral matter or salts—*e. g.*, chloride of sodium or sulphate of sodium—separates out from the liquor under operation, and such separation of mineral matter or salts forms a serious obstacle to successful working. The salts being allowed to accumulate in the vessel wherein the said distillation is carried on, they cake together, and the cakes or scales thus formed inclose much glycerine, which is thus lost, and if the accumulation takes place in the vicinity of heated surfaces or superheated steam the glycerine is readily damaged by such portion of it as may be inclosed in the cakes or scales or in contact therewith getting too large a share of heat, and thus becoming burned or decomposed. Even with the best-known means of drawing off such accumulation of salts from the lower part of the still or vessel employed by means of a valve or similar device this burning or decomposition cannot be entirely avoided, and apart from this there is the additional disadvantage that a comparatively large quantity of the liquid contents of the still must also be withdrawn together with such salts, and this has to be separated from said salts and returned to the still, these operations entailing extra expense and loss of heat. Moreover, the employment of a valve or similar device to periodically remove the accumulation of salts from the bottom of the still renders it impossible to run such still under a vacuum, which, as is well known, is a desirable condition to be established in the distillation of glycerine. Consequently, to avoid as far as possible these drawbacks, the operation has to be stopped frequently to remove the objectionable accumulations of salts, and such stoppages cause loss of time and heat and diminish the working capacity of the still. Again, in feeding a still with additional glycerine while the operation of distilling is in progress the contents of the still are apt to froth up and boil over, owing to the freshly-introduced glycerine suddenly parting with its water under the action of the increased temperature, and thus loss and inconvenience are caused.

The object of this invention is to overcome all these difficulties and to distill the glycerine from the crude material in a more perfect manner than has hitherto been accomplished.

In carrying out our invention we divide the charge of concentrated soap-lye or crude glycerine into two portions connected or separable at will, and supply the requisite heat to the upper of these portions only, which we maintain in a state of ebullition at the distilling temperature, while the lower and smaller portion is out of the influence of the heat and remains in a quiescent state. As the distillation proceeds, the mineral matters or salts are thrown out of solution and immediately fall, by virtue of their superior specific gravity, into the lower or quiescent portion of the liquor, displacing an equivalent quantity of this liquor, which rises into the upper portion, and there comes under the influence of the heat and is distilled in due course.

When the distillation has proceeded so far that the whole or nearly the whole of the quiescent portion of the liquor has been displaced by precipitated salts, we separate the upper from the lower portion by means of a suitable valve or equivalent device and remove the precipitated salts to a suitable apparatus for washing them from adhering glycerine-liquor, or in some forms of apparatus we thus wash the salts before removal from the chamber in which they were precipitated.

Having removed the salts with or without previous washing, we introduce into the now empty chamber or lower vessel a fresh charge of the concentrated soap-lye or crude glycerine to be distilled and open the valve connecting the two portions, thus bringing about the same conditions existing at the commencement—namely, the upper portion of the charge being in a state of ebullition and the lower portion quiescent—and this without interrupting the process of distillation which proceeds regularly and continuously, each fresh charge of glycerine introduced into the lower portion of the apparatus being gradually displaced by the precipitated salts and driven into the upper or distilling portion, and all caking together or burning of the salts or the glycerine adherent thereto is entirely avoided by reason of their immediate removal, as formed, from close proximity to the heated surfaces or superheated steam.

The apparatus we are now about to describe is designed for the purpose of carrying out our process above described and forms the subject of a separate application for Letters Patent of the United States filed by us September 9, 1889, Serial No. 323,373; but it will be readily understood that other forms of apparatus may be devised for the purpose.

Figure 5:
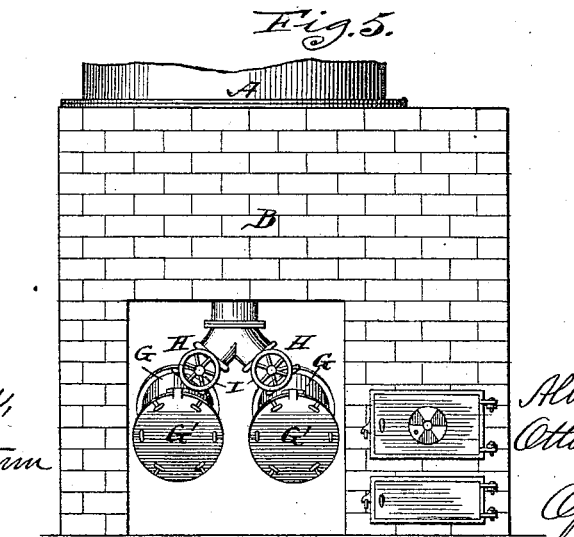

Figures 1 and 2 are respectively a vertical section and plan of one form of the apparatus fitted with one lower chamber or vessel to hold the quiescent portion of the liquor and receive the precipitated salts, which are removed to a separate apparatus for washing. Fig. 3 represents a vertical section of similar apparatus; but in this case the lower chamber or vessel is also adapted for washing the salt to free it from adhering glycerine-liquor before removal, thus obviating the necessity of employing separate apparatus for this purpose. Figs. 4 and 5 represent apparatus with two lower chambers or vessels for the quiescent portion of the liquor and receiving the precipitates. With this form of apparatus the precipitate can be dealt with more leisurely, one lower chamber being always connected to the upper part of the apparatus, while the valve connecting the other one is closed for the removal or washing and removal of the precipitates.

A is the still or vessel in which the distillation is effected, B the inclosing brick-work, and C the flue or heating space.

E and F are respectively girders and columns to carry the apparatus.

G is the lower chamber or vessel, which contains the quiescent portion of the liquor, and into which the mineral matters or salts fall when precipitated from the upper portion, and which can be separated from the upper part of the apparatus A by the closing of the valve H by means of the hand-wheel I.

$G'$ is a door through which the collected mineral matters or salts in G can be removed, and $G^2$ a strainer or perforated plate allowing the passage of liquor to the bottom of the vessel, but retaining the mineral matters or salts.

$G^3$ is a pipe through which brine containing less glycerine than the liquor adhering to the salts, or pure brine, may be admitted for the purpose of washing the crystals of mineral deposits or salts free from the glycerine-liquor adhering to them, the salts remaining upon the perforated plate or filter $G^2$ and the liquor falling through the filter and escaping by the pipe $G^4$, from which it may be collected for reuse in any convenient manner.

$G^5$ is a cock for allowing the ingress or egress of air to or from G.

K is a sand bath surrounding the distilling-vessel A and is preferably used for the purpose of modifying the action of the fire upon the heated portion of the vessel A, and M is a steam-pipe and perforated coil for the introduction of superheated steam. N is a pipe for feeding in fresh glycerine-liquor directly into A when the nature of the glycerine-liquor renders this course advisable, and O is a mechanical agitator or scraper, the action of which will be well understood without special description. The shape of the two said portions of the apparatus and the modes of applying heat to the distilling portions may be varied—as, for instance, where it is desirable not to employ direct fire in the same building where the still is situated, the part A may be jacketed and heated entirely by superheated steam, and the apparatus may be provided with thermometers or pyrometers for controlling the temperature, as is well understood.

The operation is as follows: The vessels being all charged with the concentrated soap-lye or glycerine and the valve H being open, heat is applied to the vessel A and superheated steam introduced through the coil M, and the liquor in A brought to ebullition and heated to distilling-point, when the glycerine-vapors rise together with the steam and pass over through the pipe P to a suitable condenser or condensers. During this operation the mineral matters or salts contained in the liquor are precipitated or thrown out of solution and fall through the valve H into the vessel G, displacing an equivalent quantity of the liquor in G and forcing it upward into A. This action proceeds until G is filled or nearly filled with said precipitated salts, when the valve H is closed, and in the case of using the apparatus shown in Figs. 1, 2, 4, and 5 the door $G'$ is opened and the salts withdrawn and removed to a suitable apparatus for washing them, as before described.

In the case of using the apparatus Fig. 3 the valve H is closed and the valves $G^5$ and $G^4$ are opened and the glycerine-liquor adhering to the salts is drawn off or allowed to run off through the pipe $G^4$ to a suitable receptacle. $G^4$ is then closed and a suitable quantity of washing-liquor run in through the pipe $G^3$, which is then closed, and $G^4$ is again opened and the washing-liquor withdrawn for reuse or concentration. This operation is repeated as often as may be necessary, and finally the door $G'$ is opened and the washed salt removed. G is now filled with fresh glycerine-liquor through the pipe $G^4$ or $G^3$ or otherwise by a special pipe, and, the valves $G^3$, $G^4$, and $G^5$ being closed, the valve H is opened and distillation proceeds as before.

In the case of the use of the apparatus Figs. 4 and 5, with two chambers G, these are used alternately, as will be readily understood, while in the forms of apparatus Figs. 1 and 3 the pocket A' is provided for the reception of any small quantity of salts which are precipitated during the time the valve H is closed.

The vessel or duplicate vessels G, Fig. 3, may be mounted with mechanical stirrers for the mixing of the salts with the washing-liquor, or such mixture may be effected by blowing air through the mass, for instance, by way of the pipe $G^4$, the air afterward escaping by the cock $G^5$, and the removal of the washing-liquor may be effected by direct suction or without the employment of a vacuum or by air or similar pressure from above, or, where time permits, by gravitation without pressure.

Instead of filling fresh concentrated soap-lye or crude glycerine into the vessel G after each time of removal of the salts therefrom, said lye or glycerine may, when the nature of the liquor permits, be fed in at intervals or continuously into A through the pipe N, and in this case it is simply necessary after emptying the salts from G to close the door G' and the cocks $G^3$, $G^4$, and $G^5$ and open the valve H, when the liquor in A will descend and fill the vessel G, to be in turn displaced and forced up again into A by the salt as it is precipitated. The air in G before it is thus filled will escape at time of filling this valve H, and pass away to the condensers together with the steam and glycerine vapors, or it may by preference be allowed to escape through the valve $G^5$; but it is preferable to fill G with fresh glycerine-liquor after each time of emptying, as this course avoids the loss of heat which takes place when hot liquor is allowed to flow down from A to G. It is also clear that the distillation may be effected under vacuum or pressure, or at the normal atmospheric pressure, without interrupting or otherwise interfering with the continuity of the process.

Having now fully described our invention, what we claim is—

1. The herein-described process of distilling concentrated soap-lye or the crude glycerine recovered from soap-lye, which consists in dividing the lye or glycerine under operation into two portions connected or separable at will and maintaining one such portion in a state of ebullition at the distilling temperature, while the other portion remains substantially quiescent and cooler, substantially as described.

2. The herein-described process of distilling concentrated soap-lye or the crude glycerine recovered from soap-lye, which consists in dividing the lye or glycerine under operation into two portions connected or separable at will and maintaining one such portion in a state of ebullition at distilling temperature, while the other portion remains quiescent, and the salts liberated from the distilling portion passing at once into the quiescent portion, substantially as described.

3. The herein-described process of distilling concentrated soap-lye or the crude glycerine recovered from soap-lye, which consists in dividing the lye or glycerine under operation into two portions connected or separable at will and maintaining one portion in a state of ebullition at the distilling temperature, while the other portion remains quiescent, and the salts liberated from solution in the distilling portion passing at once into the quiescent portion and removing the salts from the quiescent portion without interrupting the progress of the distillation, substantially as described.

4. The herein-described process of distilling concentrated soap-lye or the crude glycerine recovered from soap-lye, which consists in dividing the lye or glycerine under operation into two portions connected or separable at will and maintaining one portion in a state of ebullition at the distilling temperature, while the other portion remains quiescent, and the salts liberated from solution in the distilling portion passing at once into the quiescent portion and washing said salts and then removing them without interrupting the process of the distillation, substantially as described.

5. The herein-described process of distilling concentrated soap-lye or the crude glycerine recovered from soap-lye, which consists in dividing the lye or glycerine under operation into two portions connected or separable at will and maintaining one portion in a state of ebullition at the distilling temperature, while the other portion remains quiescent, and the salts liberated from solution in the distilling portion passing at once into the quiescent portion and removing said salts and feeding in fresh lye or glycerine without interrupting the progress of the distillation, substantially as specified.

6. The herein-described process of distilling concentrated soap-lye or crude glycerine recovered from soap-lye, which consists in dividing the lye or glycerine under operation into two portions and maintaining one portion in a state of ebullition at the distilling temperature, while the other portion remains quiescent, and the salts liberated from solution in the distilling portion passing at once into the quiescent portion and washing said salts and then removing them and feeding in fresh lye or glycerine without interrupting the progress of the distillation, substantially as described.

ALBERT DOMEIER.
OTTO CHRISTIAN HAGEMANN.

Witnesses:
OLIVER R. JOHNSON,
*Consulate-General U. S. A. at London, England.*
A. E. MOPOLDY,
*U. S. Consulate-General, London.*